United States Patent
Yamanishi et al.

(10) Patent No.: US 7,019,849 B2
(45) Date of Patent: Mar. 28, 2006

(54) DEPTH MEASURING APPARATUS

(75) Inventors: Takashi Yamanishi, Hachioji (JP); Hisashi Masago, Hachioji (JP)

(73) Assignee: Jasco Corporation, Tokyo (JP)

( * ) Notice: Subject to any disclaimer, the term of this patent is extended or adjusted under 35 U.S.C. 154(b) by 218 days.

(21) Appl. No.: 10/799,598

(22) Filed: Mar. 15, 2004

(65) Prior Publication Data
US 2004/0239951 A1 Dec. 2, 2004

(30) Foreign Application Priority Data
Mar. 18, 2003 (JP) ............................. 2003-074167

(51) Int. Cl.
*G01B 11/00* (2006.01)

(52) U.S. Cl. ...................... 356/626; 356/625; 356/624

(58) Field of Classification Search ................ 356/625, 356/626, 630; 250/559.19, 559.27
See application file for complete search history.

(56) References Cited

U.S. PATENT DOCUMENTS

| | | | |
|---|---|---|---|
| 4,965,441 A | 10/1990 | Picard | |
| 5,543,918 A | 8/1996 | Abraham et al. | |
| 5,880,844 A * | 3/1999 | Seng | 356/613 |
| 6,263,234 B1 | 7/2001 | Engelhardt et al. | |

FOREIGN PATENT DOCUMENTS

| | | |
|---|---|---|
| DE | 195 18 006 A1 | 11/1996 |
| GB | 2 337 815 A | 12/1999 |

* cited by examiner

Primary Examiner—Gregory J. Toatley, Jr.
Assistant Examiner—Roy M. Punnoose
(74) Attorney, Agent, or Firm—Oliff & Berridge, PLC (57) ABSTRACT

A depth measuring apparatus is disclosed that comprises a mover for moving in an optical axis direction an objective lens for condensing a parallel light beam from a light emitter onto a measurement spot of a sample and converting light from the measurement spot to a parallel light beam, image forming lens for projecting light from the measurement spot obtained via the objective lens, aperture for passing only light from the focal point position of the objective lens, a surface scattered light information acquirer for detecting, while the objective lens is being moved, the amount of light passing through the aperture and having an excitation wavelength of the test subject, a fluorescence information acquirer for detecting, while the objective lens is being moved, the amount of light passing through the aperture and having a fluorescence wavelength of the subject, and a distance information acquirer for obtaining distance information between a position of the objective lens where the detection value of surface scattered light by means of the surface scattered light information acquirer is maximum and a position of the objective lens where the detection value of fluorescence by means of the fluorescence information acquirer is maximum, wherein the depth of the test subject within the sample is obtained based on the acquired distance information with a position on a surface of the sample as a reference.

4 Claims, 4 Drawing Sheets

DEPTH MEASURING APPARATUS

RELATED APPLICATIONS

This application claims priority to the Japanese Patent Application 2003-74167 dated on Mar. 18, 2003 and is hereby incorporated with reference for all purposes.

BACKGROUND OF THE INVENTION

1. Field of the Invention

The present invention relates generally to a depth measuring apparatus, and, more particularly, to a non-destructive measuring mechanism for the depth direction of the interior of a sample.

2. Prior Art

In the field of manufacturing multi-layered bodies for example, the thicknesses of impurity layers, etc., inside the multi-layered bodies have hitherto been tested as part of product quality control.

Conventionally, destructive testing is commonly used in testing the thickness of a specific layer inside this type of multi-layered body. In the prior art, a sample is taken from among products, a cross-section is cut therefrom, and the thickness of the specific layer is measured. Also, conventionally, whether the thickness of the specific layer has attained a predetermined thickness is determined based on the test result of the sample.

However, in the conventional destructive testing described above, the product is destroyed for each testing. As a result, there is room for improvement in terms of reducing the costs incurred in testing. Also, in the above described prior art destructive testing, the individual products are not actually tested, but rather a sampling method is employed. That is, in the prior art, based on the test results of specific samples taken from among a large number of products, the acceptability of the rest of the products is estimated. There is therefore room for improvement in terms of the reliability of testing.

In order to respond to these requirements, development of a technique that can non-destructively test each individual product is strongly desired. However, there is no suitable technique that can solve this requirement in the prior art.

SUMMARY OF THE INVENTION

The present invention was conceived in light of the above problems of the prior art, and has as its object to provide a depth measuring apparatus that can non-destructively obtain depth distance information of the interior of a sample.

The result of the intensive investigation carried out by the inventors of the present application into non-destructively measuring the depth of the interior of a sample was confirmation that many of the impurity layers in the samples had a fluorescence that was rarely seen in high purity layers. Thus, the inventors of the present application, by utilizing the intrinsic fluorescence of the test subjects (impurity layers and the like), found that they could non-destructively obtain depth distance information for test subjects in the interior of samples, and arrived at the completion of the present invention.

In order to achieve the above object, the depth measuring apparatus of the present invention is directed to a depth measuring apparatus for, with regard to a sample that includes a test subject having fluorescence within the sample and that has transmittance along at least a depth that is a measurement range, obtaining depth distance information of the test subject within the sample, with a position of a surface of the sample as a reference. The depth measuring apparatus comprises a light emitter, an objective lens, a mover, an image forming lens, a confocal aperture, a surface scattered light information acquirer, a fluorescence information acquirer and a distance information acquirer. The depth measuring apparatus is characterized in that depth distance information of the test subject within the sample is acquired based on the relative distance information obtained by the distance information acquirer, with a position on a surface toward the objective lens of the sample as a reference.

The light emitter includes a point light source and converts light from the point light source to a parallel light beam having an excitation wavelength causing only the test subject within the sample to emit fluorescence.

The objective lens is placed freely movable in a light axis direction of the objective lens. The object lens condenses a parallel light beam from the light emitter onto a measurement spot of the sample. The objective lens converts light from the measurement spot of the sample into a parallel light beam.

The mover moves the objective lens in the light axis direction thereof.

The image forming lens forms an image of light from the measurement spot of the sample obtained via the objective lens.

The confocal aperture is placed at a position optically conjugate to the point light source and a focal point position of the objective lens via the objective lens and the image forming lens, which is an image formation position of the image forming lens. The confocal aperture substantially passes only light from the focal point position of the objective lens.

The surface scattered light information acquirer detects an amount of light passing through the confocal aperture and having a wavelength equivalent to the excitation wavelength, while the focal point position of the objective lens is being moved by the mover.

The fluorescence information acquirer detects an amount of light passing through the confocal aperture and having a wavelength equivalent to the fluorescence wavelength, while the focal point position of the objective lens is being moved by the mover.

The distance information acquirer obtains at least relative distance information in the light axis direction between a position of the objective lens where a light amount detection value of surface scattered light by the surface scattered light information acquirer is maximum and a position of the objective lens where a light amount detection value of fluorescence by the fluorescence information acquirer is maximum.

As used herein, the test subject refers to one forming a layer generally in the direction substantially perpendicular to the depth direction of the sample. Also, if it has fluorescence that can distinguish other regions in the sample in at least part of the direction substantially perpendicular to the depth direction, those existing features may include arbitrary ones.

Also in the present invention, it is preferable that only the test subject within the sample has fluorescence. However, in the present invention, even if portions of the sample other than the test subject have some fluorescence, if the amount (and/or the wavelength) of that fluorescence is such that it can be distinguished from the fluorescence of the test subject within the sample, those portions within the sample may also be included.

As used herein, obtaining relative distance information means obtaining at least distance information from the objective lens side surface of the sample to the objective lens side border of the test subject within the sample. This also includes, by being able to further match a light amount detection value of the fluorescence with a position information of the objective lens, obtaining distribution information (test subject thickness information within the sample and the like) in the depth direction of the subject within the sample.

As used herein, the confocal aperture means not only simply an aperture, but also apertures in which an opening that passes only light from the focal point of the objective lens is provided in a screen portion that cuts light from locations other than the focal point of the objective lens. Also, although the shape of the aperture is not particularly limited to a pinhole, slit, or the like, a pinhole is particularly preferable in terms of obtaining information from more minute measurement regions of the sample.

In the present invention, the above objective lens and image forming lens are preferably lenses without any chromatic aberrations.

As used herein, without chromatic aberrations means no image dislocation in light of excitation wavelengths and light of fluorescence wavelengths. In the present invention, a Cassegrain lens system, which is a lens system with mirror attached, can be used as a lens without chromatic aberrations, for example.

As used herein, lenses include normal lenses and optical systems having the same functions as lenses. As a result, the Cassegrain lens system without chromatic aberrations includes a Cassegrain reflector optical system.

In the present invention, the light emitter comprises an excitation wavelength selector, a collimator lens. A portion between the collimator lens and the objective lens is preferably a parallel light beam portion.

The excitation wavelength selector passes only light having a wavelength equivalent to the excitation wavelength causing only the test subject within the sample to emit fluorescence among the light from the point light source.

The collimator lens converts light from the point light source to a parallel light beam.

In the present invention, the portion between the objective lens and the image forming lens is a parallel light beam portion. A half mirror is provided, in the parallel light beam portion between the collimator lens and the objective lens. A parallel light beam from the collimator lens is incident on the objective lens via the half mirror. Preferably, light from the measurement spot of the sample obtained by the objective lens is incident on the image forming lens via the half mirror.

In the present invention, a dichroic mirror can be used as a half mirror for example.

DESCRIPTION OF THE PREFERRED EMBODIMENT

A preferred embodiment of the present invention will now be described with reference to the drawings.

Figure 1:
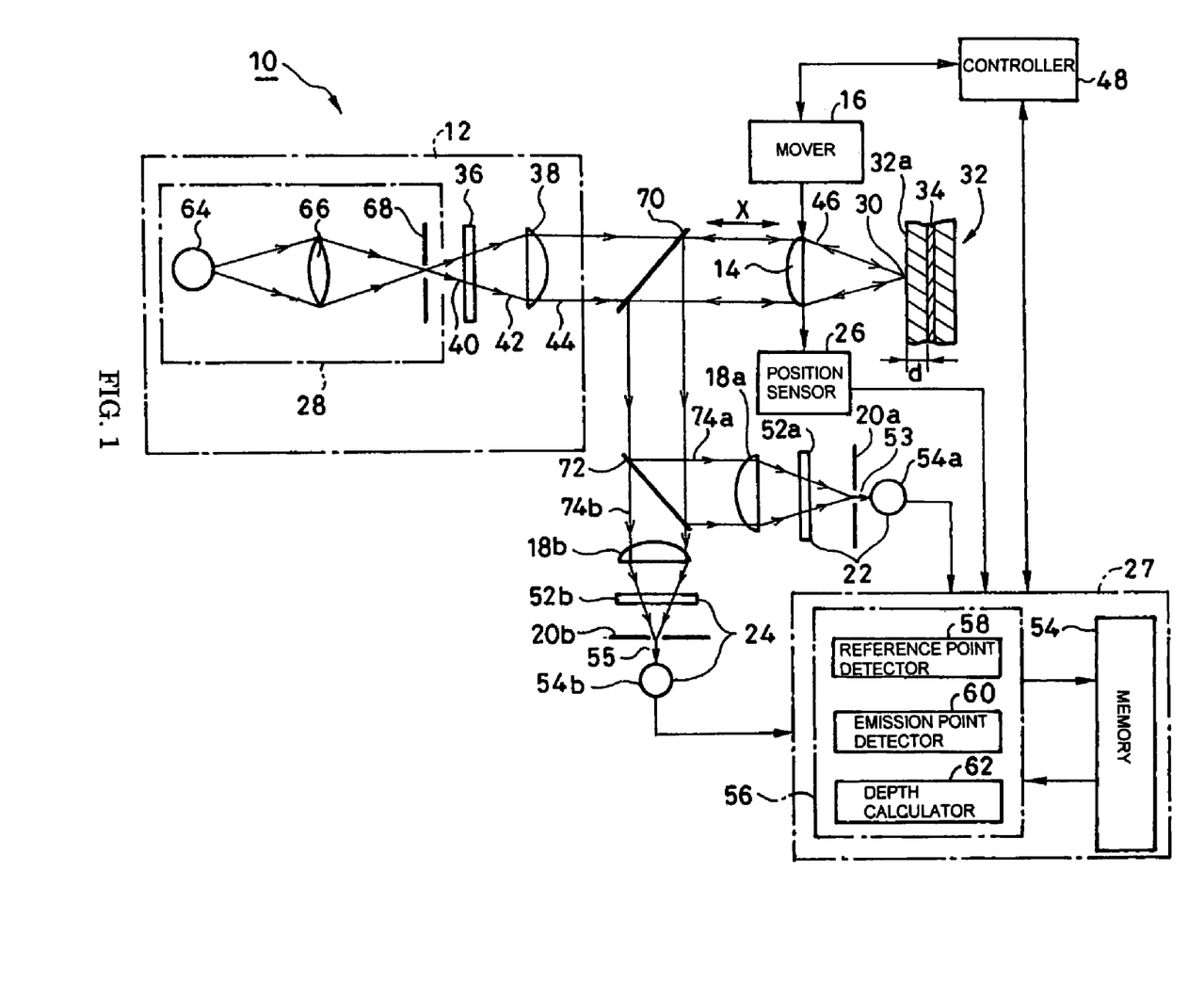
FIG. 1 is a schematic diagram of the overall structure of a depth measuring apparatus according to an embodiment of the present invention.

FIG. 1 shows the schematic structure of a depth measuring apparatus according to an embodiment of the present invention.

The light emission point depth measuring machine (depth measuring apparatus) 10 shown in the drawing comprises a light emitter 12, an objective lens 14, a mover 16, image forming lenses 18a and 18b, confocal pinholes (confocal apertures) 20a and 20b, a surface scattered light information acquirer 22, a fluorescence information acquirer 24, a position sensor (distance information acquirer) 26, a computer 27.

The point light source 28 of the light emitter 12, the focal point position 30 of the objective lens 14, and the confocal pinholes 20a and 20b are arranged in an optically conjugate relationship via the objective lens 14 and the image forming lenses 18a and 18b.

The computer 27 obtains depth information d from a resin layer (the test subject) 34 inside laminated glass 32 (sample), with the position of the surface (objective lens side surface) 32a of the laminated glass 32 as a reference, based on relative distance information acquired by distance information acquirer (the position sensor 26 and the like).

In the present embodiment, the light emitter 12 comprises, for example, the point light source 28, a band pass filter (excitation wavelength selector) 36, and a collimator lens 38. Light 40 from the point light source 28 becomes light 42 having an excitation wavelength that causes only the resin layer 34 of the laminated glass 32 to emit fluorescence by means of the band pass filter 36. The light 42 passing through the band pass filter 36 becomes a parallel light beam 44 by means of the collimator lens 38.

The objective lens 14 is provided so as to be freely movable in the axial direction of the light beam (the direction of the arrow X in the drawing). The objective lens 14 condenses the parallel light beam 44 from the light emitter 12 onto a measurement spot (corresponding to the focal point position 30 of the objective lens 14 in the drawing) on the laminated glass 32. Also, the objective lens 14 makes the light 46 from the measurement spot of the laminated glass 32 a parallel light beam.

The mover 16 is connected to a controller 48. The controller 48 is connected to the computer 27. The objective lens 14 is moved in the axial direction of the light beam (indicated in the drawing by the arrow X) by the controller 48 controlling the movement of the mover 16. The mover 16 thereby moves the focal point position 30 of the objective lens 14 in the direction of the arrow X in the drawing.

The image forming lens 18a for detecting surface scattered light and the image forming lens 18b for detecting fluorescence project the light 46 from the measurement spot of the laminated glass 32 obtained via the objective lens 14.

The confocal pinhole 20a for detecting surface scattered light and the confocal pinhole 20b for detecting fluorescence are the respective image formation positions of the image forming lenses 18a and 18b, and are provided in optically conjugate positions to the point light source 28 and the focal point position 30 of the objective lens 14 via the objective lens 14 and the image forming lenses 18a and 18b. The confocal pinholes 20a and 20b only pass the light from the focal point position 30 of the objective lens 14.

The surface scattered light information acquirer 22 comprises for example a band pass filter 52a that passes only light that has a wavelength equivalent to an excitation wavelength of the resin layer 34, and a light detector (photo-multiplier or the like) 54a. While the mover 16 is moving the objective lens 14 in the direction of the arrow X in the drawing, the amount of the light 53 having a wavelength equal to an excitation wavelength that passes through the confocal pinhole 20a and also passes through the band pass filter 52a is detected by the light detector 54a.

The fluorescence information acquirer 24 comprises for example a band pass filter 52b that passes only light that has a wavelength equivalent to a fluorescence wavelength of the resin layer 34, and a light detector (photo-multiplier or the like) 54b. While the mover 16 is moving the objective lens 14 in the direction of the arrow X in the drawing, the amount of the light 55 having a wavelength equal to a fluorescence wavelength that passes through the confocal pinhole 20b and further passes through the band pass filter 52b is detected by the light detector 54b.

The position sensor 26 is connected to the computer 27. The computer 27 comprises a memory 54 and CPU 56.

Sets of received light amount data from the light detector 54a and position data (in the direction of the arrow X in the drawing) of the objective lens 14 from the position sensor 26 corresponding to each set of data, obtained while the mover 16 is moving the objective lens 14 in the direction of the arrow X in the drawing, are stored in the memory 54 via the CPU 56 of the computer 27. At the same time, sets of received light amount data from the light detector 54b, and position data of the objective lens 14 in the direction of the arrow X in the drawing, obtained from the position sensor 26 and corresponding to each set of data, are stored in the memory 54 via the CPU 56 of the computer 27.

The CPU 56 comprises a reference point detector 58, a light emission point detector 60, and a depth calculator 62.

The reference point detector 58 detects, from among the data stored in the memory 54, position data of the objective lens 14 in which the light amount detection value of surface scattered light from the light detector 54a is maximum.

The light emission point detector 60 detects, from among the data stored in the memory 54, position data of the objective lens 14 in which the light amount detection value of fluorescence from the light detector 54b is maximum.

The depth calculator 62, based on the position data of the objective lens 14 detected by the reference point detector 58 and the position data of the objective lens 14 detected by the light emission point detector 60, obtains movement distance information of the objective lens 14 from a reference point to a light emission point. The depth calculator 62, based on the obtained movement distance information of the objective lens 14, attains a depth distance d from the laminated glass surface 32a to the resin layer 34 inside the laminated glass 32.

In the present embodiment, the point light source 28 comprises a light source, 64, a condenser lens 66, and a pinhole 68.

Also in the present embodiment, between the collimator lens 38 and the objective lens 14 where the light from the point light source 28 becomes the straight beam 44 is a parallel light beam portion. Between the objective lens 14 and the image forming lenses 18a and 18b is a parallel light beam portion. In the parallel light beam portion between the collimator lens 38 and the objective lens 14 a first half mirror 70 is provided. The parallel light beam 44 from the collimator lens 38 is incident on the objective lens 14 via the first half mirror 70. Light 46 from the measurement spot of the laminated glass 32 obtained from the objective 14 is incident of the image forming lenses 18a and 18b via the half mirrors 70 and 72. In the present invention, for example, a dichroic mirror can be used as the half mirror 70 and 72 respectively.

Operations

The light emission point depth measuring machine 10 according to the present embodiment is constructed basically as described above, and the operations thereof will be described hereinbelow.

The feature of the present invention is that, in order to measure the depth of a specific layer in a multi-layered body, instead of the destructive measurement of the prior art, it non-destructively obtains depth distance information from the surface 32a to a resin layer of laminated glass 34 by utilizing the intrinsic fluorescence of the resin layer 34 inside the laminated glass 32.

<Light Emission Point Detection>

For this reason, in the present embodiment, in order to detect the position in the depth direction of the resin layer 34 within the laminated glass 32, a light emission point is detected by a confocal optical system. In the present embodiment, in order to detect the light emission point, a received light detection value from the light detector 54b for detecting fluorescence is monitored by the computer 27 while the measurement spot is being moved in the depth direction with the laminated glass 32 by the controller 48.

That is, when the focal point position of the objective lens 14 reaches the resin layer 34 within the laminated glass 32, the light amount of light 55 received by the light detector 54 for detecting fluorescence is highest.

For this reason, in the present embodiment, while the focal point position 30 of the objective lens 14 is being moved by the mover 16 and the like, the position of the objective lens 14 at which the light amount detection value of light 55 passing through the confocal pinhole 20b and having a luminescent wavelength is greatest is detected by the fluorescence information acquirer 24 and the like, whereby the position in the depth direction of the resin layer 34 within the laminated glass 32 can be detected.

<Reference Point Detection>

Here, in order to accurately, and in the same way every time, measure the position in, the depth direction of the resin layer 34, it is necessary to set a reference point for measuring the depth.

For this reason, in the present embodiment, as well as the light emission point, the position on the laminated glass surface 32a that is the reference point is detected by the confocal optical system. Also in the present embodiment, in order to detect the position of the sample laminated glass surface 32a, a received light detection value from the light detector 54a for detecting surface scattered light is monitored by the computer 27 while the measurement spot is being moved in the plus (rightward) direction of the arrow X in the drawing as described above.

Namely, in the present embodiment, as the focal point position 30 of the objective lens 14 reaches the laminated glass surface 32a, the amount of the light 53 received by the light detector 54a for detecting surface scattered light is greatest.

To this purpose, the surface scattered light information acquirer 22 and the like, while the objective lens 14 is being moved in the direction of the arrow X in the drawing by the mover 16 and the like, detects the position of the objective lens 14 at which the light amount detection value of light passing through the confocal pinhole 20a and having an excitation wavelength is greatest. The position of the surface 32a of the laminated glass 32 can thereby be detected in the present embodiment.

<Depth Distance Acquisition>

In the present embodiment, the position of the objective lens 14 at the reference point and the position of objective lens 14 at the light emission, point are detected. As a result, in the present embodiment, based on the relative movement distance in the direction of the arrow X in the drawing of the objective lens 14, the depth distance d from the laminated glass surface 32a to the resin layer 34 within the laminated glass 32 can be obtained.

In this way, in the present embodiment the depth distance d of the resin layer 34 inside the laminated glass 32 from the laminated glass surface 32a is measured by monitoring the amount of light of both surface scattered light and fluorescence from the laminated glass 32 using the confocal optical system.

As a result, in the present embodiment, the depth distance d of the resin layer 34 inside the laminated glass 32 can be accurately measured every time with the position of the reference point as a reference. Accordingly, in the present embodiment, compared to inventions that are not provided with a device for measuring both a reference point and a light emission point, a more accurate depth distance can be acquired.

Consequently, according to the light emission point depth measuring machine 10 of the present embodiment, the depth distance d of the resin layer 34 within the laminated glass 32 can be measured non-destructively. The present embodiment can thereby greatly reduce the cost of testing compared to conventional destructive testing techniques.

Further, in the present embodiment, by performing the above described non-destructive measurement, can easily perform measurement even where there are a large number of samples. The reliability of testing can thereby be greatly improved in the present embodiment compared to conventional destructive testing techniques.

Hereunder, the operation of the present embodiment will be described in more detail.

Confocal Optical System

In the present embodiment, light from the light source 64 is focused on the pinhole 68 by the condenser lens 66. Among the light that passes through the pinhole 68, only light 42 that has an excitation wavelength and causes only the resin layer 34 to emit fluorescence is extracted by the band pass filter 36. The light 42 that passes through the band pass filter 36 is converted to a parallel light beam 44 by the collimator lens 38.

The parallel light beam 44 that causes only the resin layer 34 inside the laminated glass 32 to emit fluorescence and has an excitation wavelength thus obtained is incident on the objective lens 14 via the half mirror 70. This light is focused on measurement spot of the laminated glass 32 by the objective lens 14.

The light 46 from the measurement spot of laminated glass 32 reaches the second half mirror 72 via the objective lens 14 and first half mirror 70. This light is divided into a first separated beam 74a and second separated beam 74b by the second half mirror 72. The first separated beam 74a is incident on the image forming lens 18a for detecting surface scattered light. The second separated beam 74b is incident on the image forming lens 18b for detecting fluorescence.

<Reference Point Detection>

The first separated beam 74a from the second half mirror 72 is incident on the band pass filter 52a via the image forming lens 18a for detecting surface scattered light. Only the surface scattered light having a wavelength the same as an excitation wavelength among the light 46 from the measurement spot of the laminated glass 32 is extracted by the band pass filter 52a. The surface scattered light passing through the band pass filter 52a is incident on the confocal pinhole 20a for detecting surface scattered light.

Here, the focal point position of the objective lens 14 and the position of the confocal pinhole 20a for detecting surface scattered light have an optically conjugate relationship. As a result extraneous light from positions other than the measurement spot of the laminated glass 32 (other than the focal point position 30 of the objective lens 14) can be cut by the confocal pinhole 20a.

Namely, the focal point of the objective lens 14 is also the focal point on the confocal pinhole 20a which is the imaging surface of the image forming lens 18a. As a result, light from positions on the sample where the focal point is displaced does not substantially pass through the confocal pinhole 20a. On the other hand, only the light of the focal point position 30 of the objective lens 14 passes through and is received by the light detector 54a. Consequently, the surface scattered light intensity of only the portion of the focal point position 30 of the objective lens 14 can be detected by the light detector 54a.

<Light Emission Point Detection>

The second separated beam 74b from the second half mirror 72 is incident on the band pass filter 52b for detecting fluorescence via the image forming lens 18b for detecting fluorescence. Only fluorescence from the resin layer 34 among the light 46 from the measurement spot of the laminated glass 32 is extracted by the band pass filter 52b. The fluorescence passing through the band pass filter 52b is incident on the confocal pinhole 20b for detecting fluorescence.

Here, in the present embodiment, the focal point position of the objective lens 14 and the position of the confocal pinhole 20b for detecting fluorescence have an optically conjugate relationship in the same way as with the confocal pinhole 20a for detecting surface scattering light. As a result, extraneous light from positions other than the measurement spot of the laminated glass 32 (other than the focal point position 30 of the objective lens 14) can be cut by the confocal pinhole 20b.

Namely, the focal point of the objective lens 14 is also the focal point on the confocal pinhole 20b which is the imaging surface of the image forming lens 18b. As a result, light from positions on the sample where the focal point is displaced does not substantially pass through the confocal pinhole 20b. On the other hand, only the light of the portion that matches the focal point inside the sample passes through the confocal pinhole 20b and is received by the light detector 54b. As a result, in the present embodiment the fluorescence intensity of only the focal point portion inside the sample can be detected by the light detector 54b.

In the present embodiment, because a photo-multiplier is used as the light detector (especially the light detector 54b), fluorescence can be detected down to the weakest degree.

<Relationship Between Amount of Light Received by Light Detectors and Position of Objective Lens>

Here, in the, present embodiment, by moving the objective lens 14 in the direction of the arrow X in the drawing by means of the mover 16 and the like, the focal point position 30 of the objective lens 14 is moved toward the inside from the laminated glass surface 32a. In the present embodiment, while the focal point position 30 of the objective lens 14 is being moved, the amount of the surface scattered light and the amount of the fluorescence from the laminated glass 32 are monitored.

With regard to the amount of surface scattered light 53 obtained by the light detector 54a and the position of the objective lens 14 obtained by the position sensor 26, that relationship can be obtained as shown in FIG. 2. With regard to the amount of fluorescence 55, obtained by the light detector 54b and the position of the objective lens 14, that relationship can be obtained as shown in FIG. 3.

<Reference Point Detection>

Figure 2A:
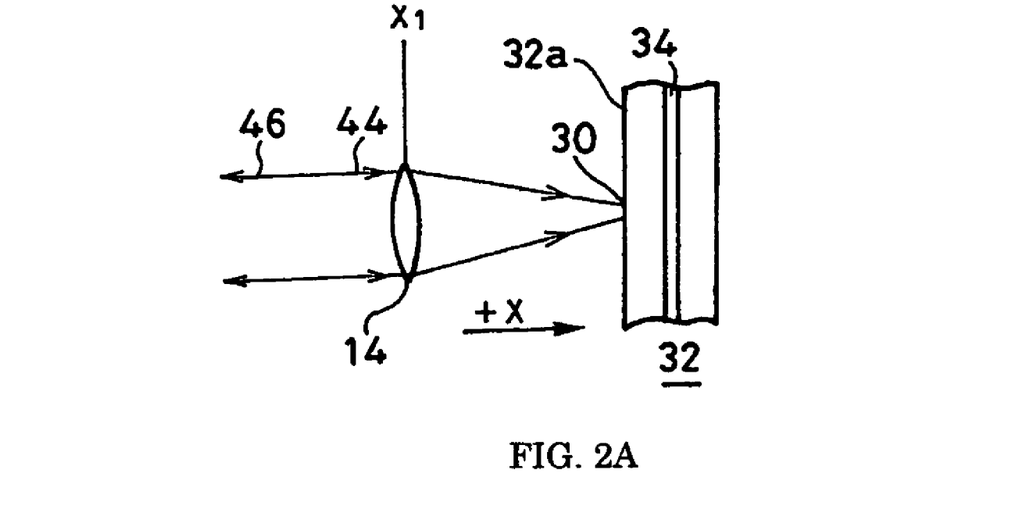
FIG. 2 is a diagram illustrating the relationship between a focal point position of an objective lens and the superficial scattered light detection value obtained by a light detector of the present embodiment.
Figure 2B:
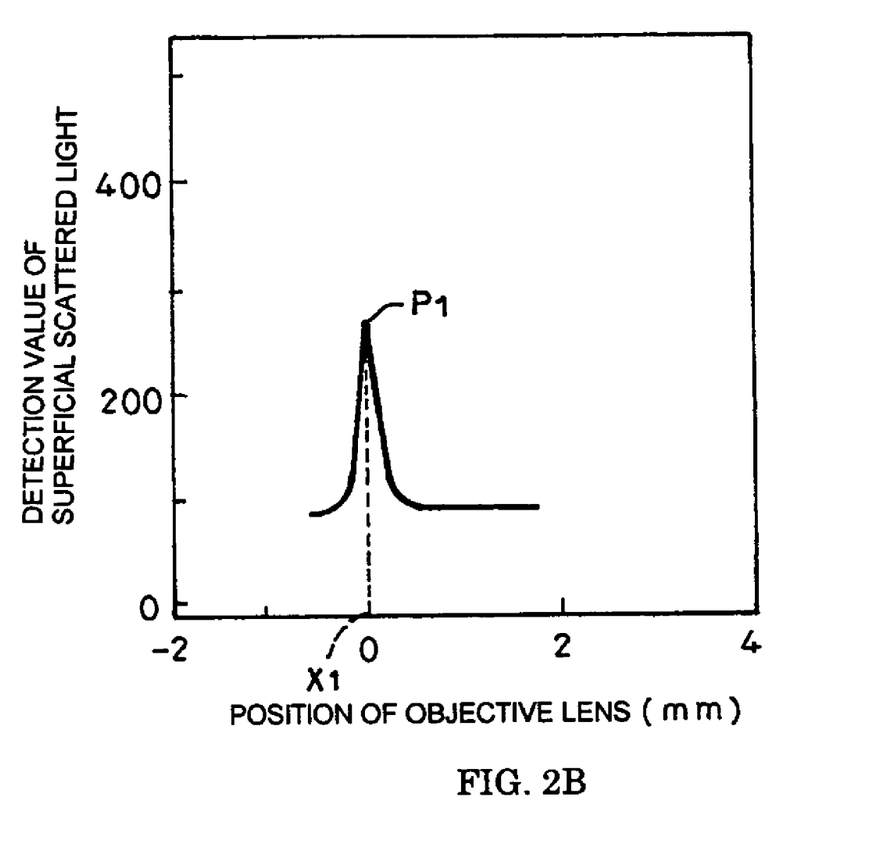

As shown in FIG. 2(A) for example, while the objective lens 14 is being moved in the axial direction of the light (+X direction), if the focal point position 30 of the objective lens 14 is positioned on the laminated glass surface 32a, a received light detection value of the surface scattered light from the light detector for detecting surface scattered light exhibits a maximum value (peak $P_1$) as shown in FIG. 2(B). On the other hand, fluorescence is not substantially detected by the light detector for detecting fluorescence.

As a result, the computer determines that when the received light amount value from each of the light detectors exhibits this type of value, at that point in time the focal point position 30 of the objective lens 14 is at a position above the surface 32a of the laminated glass 32. The computer makes this position information of the objective lens 14 at that point in time position information $X_1$.

<Light Emission Point Detection>

Figure 3A:
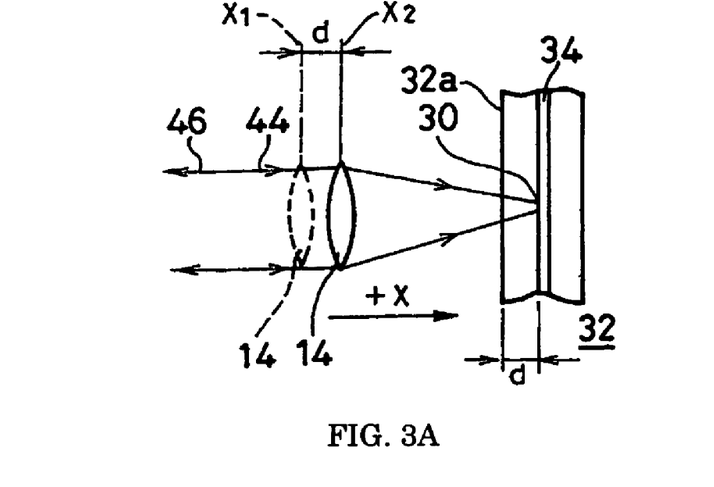
FIG. 3 is a diagram illustrating the relationship between a focal point position of an objective lens and the fluorescence detection value obtained by a light detector of the present embodiment.
Figure 3B:
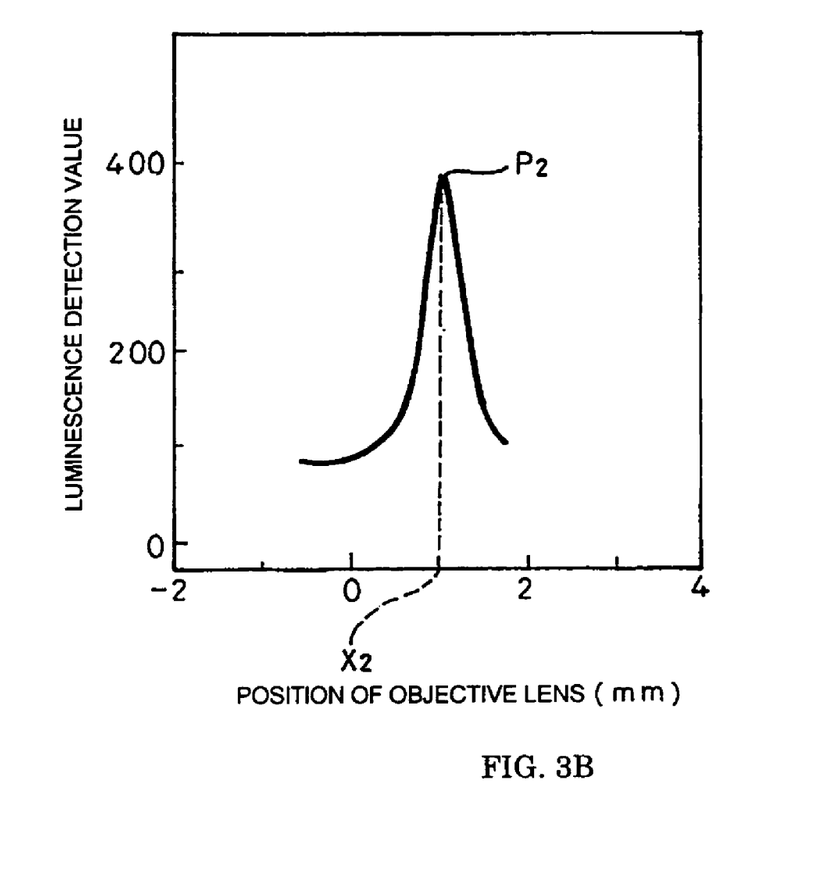

Also while the objective lens 14 is being moved further in the direction of the arrow +X shown in the drawing as shown in FIG. 3(A) for example, if the focal point position 30 of the objective lens 14 is positioned at the objective lens side border of the resin layer 34, a received light detection value of the fluorescence from the light detector for detecting fluorescence exhibits a maximum value (peak $P_2$) as shown in FIG. 3(B) of the same drawing. On the other hand, surface scattered light is not substantially detected by the light detector for detecting surface scattered light.

As a result, the computer determines that when the received light amount value from each of the light detectors detects this type of received light detection value, at that point in time the focal point position 30 of the objective lens 14 is at a position on the objective lens side border of the resin layer 34 inside the laminated glass 32. The computer makes this position information of the objective lens 14 at that point in time position information $X_2$.

<Depth Distance>

Then, the computer obtains the difference in position ($X_2-X_1$) of the objective lens 14 at these points in time when the reference point and light emission point are detected. The computer makes the this the depth distance d from the laminated glass surface 32a to the light emission layer 34 inside the laminated glass 32.

<Test Subject Distribution Measurement>

Although there are variations in the light amount detection value of fluorescence while the focal point position 30 of the objective lens 14 is being positioned at the resin layer 34 inside the laminated glass 32, the fluorescence is detected by the light detector 54b.

As a result, if the light amount detection value of the fluorescence is larger than a predetermined threshold, the fluorescence light amount detection values and positions of the objective lens 14 corresponding thereto are monitored while the objective lens 14 is being moved in the depth direction. This is continued until at least the light amount detection value of fluorescence crosses the threshold. The distribution in the depth direction (the thickness of the resin layer 34 for example) of the resin layer 34 inside the laminated glass 32 can thereby be non-destructively detected in the present embodiment.

The fluorescence information acquirer 24 for example, while the focal point position 30 of the objective lens 14 is being moved by the mover 16 and the like, even after the position of the objective lens 14 where the light amount detection value of the light 55 passing through the confocal pinhole 16b and having a fluorescence wavelength is greatest is detected, continues monitoring light amount detection values of the luminescent light (fluorescence) 55 and the positions of the objective lens 14 corresponding thereto until the light amount detection value of the luminescent light 55 crosses the predetermined threshold. The border position of the resin layer 34 on the side opposite to the border position on the objective lens side can there by be detected in the present embodiment.

In the present embodiment, by detecting the border position on the objective lens side of the resin layer 34 and the border position on the opposite side of the resin layer 34 in this way, the thickness of the resin layer can be measured.

In this manner in the present embodiment, by moving the objective lens 14 in the axial direction of the light beam, the length of the parallel light beam portion of the confocal optical system is extended and the distance to the measurement spot in the laminated glass 32 changes. The position of the laminated glass surface 32a and the distribution in the depth direction of the resin layer 34 inside the laminated glass 32 can thereby be non-destructively measured in the present embodiment.

Parallel light Beam Portion

<Objective Lens>

In the present embodiment, the objective lens 14 is moved in order to move the focal point position 30 of the objective lens 14 (in order to move the measurement spot in the depth direction). In such a case, when the objective lens 14 is inserted into the light portion during imaging, it is difficult to maintain the conjugate relationship between the focal point position 30 of the objective lens 14 and the confocal pinholes 20a and 20b.

In the present embodiment, the light from the point light source 28 becomes a parallel light beam 44 by means of the collimator lens 38. Also, the objective lens 14 is inserted into a portion of the parallel light beam 44 from the collimator lens 38.

As a result, in the present embodiment, because the measurement spot is moved in the depth direction, even if the objective lens 14 is moved the conjugate relationship between the focal point position 30 of the objective lens 14 and the confocal pinholes 20a and 20b can be more accurately maintained. Measurement can thereby be more accurately performed in the present embodiment.

Types of Lenses

If a normal objective lens in which measures have not been taken with respect to chromatic aberration is used, the chromatic aberration then becomes a problem. If the excitation wavelength and the fluorescence wavelength of the resin layer (test subject) 34 deviate, that problem becomes more serious.

Namely, conventionally, with light having an excitation wavelength and light having a fluorescence wavelength, the focal point position of the conventional objective lens and the image formation positions of conventional image forming lenses do not correspond in the direction of the optical axis. Therefore, conventionally, measurement accuracy decreases.

Thus the second feature of the present invention is that, in order to solve the problem of chromatic aberration that reduces the accuracy of measurement, lenses with no chromatic aberrations are used as the objective lens 14 and image forming lenses 18a and 18b.

As a result, in the present embodiment, as an example of a lens with no chromatic aberration, a Cassegrain lens system (Cassegrain reflector optical system), which is a lens system that includes mirrors, is used.

In the present embodiment produced in this manner, by using a lens without chromatic aberration, even if the excitation wavelength and the fluorescence wavelength of the resin layer 34 deviate, the focal point position of the objective lens 14 and the image formation positions of the image forming lenses 18a and 18b of light having an excitation wavelength and light having a fluorescence wavelength are more coincident.

Consequently, in the present embodiment, even if the excitation wavelength and the fluorescence wavelength of the resin layer 34 deviate, measurement by the confocal optical system can be more accurately performed.

Modified Examples

The present invention is not limited to the above-described structure, and various modifications are possible within the scope of the gist of the invention.

<Samples>

Although the above-described structure was described with the example of measurement of the thickness of a resin layer in laminated glass, the present invention is not limited thereto. It can be applied to any multi-layered body having translucency such as a laminated mirror or the like.

For example, an EL panel uses a material definitely having fluorescence within the panel. As a result, the present invention is preferably used to obtain a profile in the depth direction within the EL panel.

Also, the above structure was described using a test subject that absorbs excitation light of 250 nm and has fluorescence that emits light in the neighborhood of 400 nm as an example. However, the present invention is not limited to this. The present invention can used advantageously to suitably set, for example, the selection wavelength of the excitation wavelength by means of the band pass filter 36 and band, pass filter 52a, and the selection wavelength of the fluorescence wavelength by means of the band pass filter 52b, according to the excitation wavelength and fluorescence wavelength of each test subject.

<Light Emitter>

The above structure was described with regard to an example of a light emitter provided with a band pass filter as an example of excitation wavelength selector. However, the present invention is not limited thereto. In a case where a light source that attains single color light having the excitation wavelength of the test subject is used as the light source, this type of excitation wavelength selector can be omitted. In such a case, it is particularly preferable to provide, after a laser (as an example of a light source) that forms the point light source, an expander lens or the like for expanding the laser beam from the laser.

<Distance Information Acquirer>

The above structure was described with regard to an example where a position sensor was provided in the objective lens. However, the present invention is not limited thereto, and using a pulse motor in the mover is also acceptable. Also, in the present invention, obtaining the movement distance information of the objective lens based on the pulse frequency imposed on the pulse motor by the computer or the controller, without providing a position sensor, is particularly preferred from the viewpoint of structural simplification.

<Optical Arrangement>

There are cases where if the wavelength interval between the surface scattered light and the fluorescence from the sample is narrow, it is difficult distinguish between the surface scattered light and the fluorescence. In order to more accurately measure in such cases, in the above structure an explanation was given of an example where a second half mirror 72 divided the light into a light path for detecting the surface scattered light and a light path for detecting the fluorescence. However, the present invention is not limited thereto. If the wavelength interval between the surface scattered light and the fluorescence from the sample is wide, the second half mirror 72 can be omitted and these wave paths can be reduced to one wave path.

In this case, by using a band pass filter with low transmittance, it is preferable to use one filter that transmits surface scattered light of 250 nm and fluorescence of 400 nm, for example. Then, by arranging the one filter and one light detector in the one light path, both the surface scattered light and fluorescence can be measured.

Figure 4:
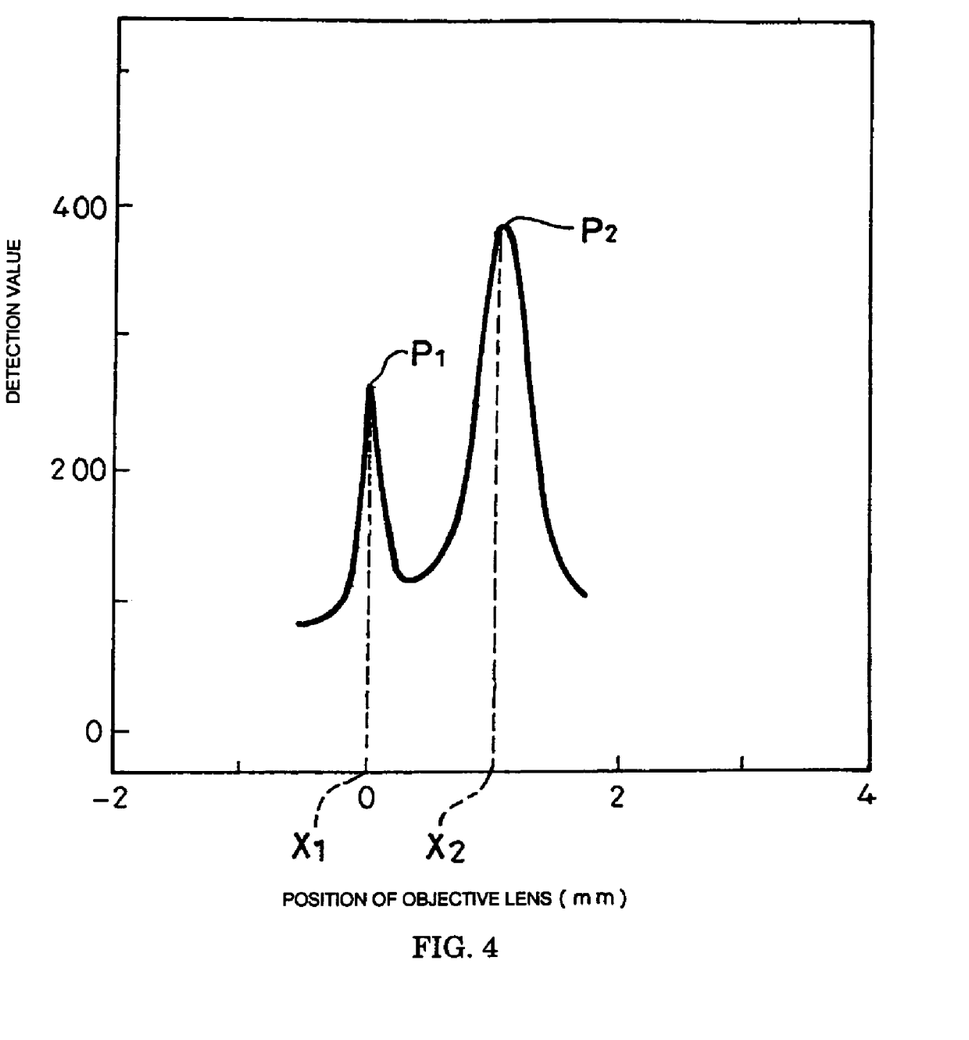
FIG. 4 is a diagram illustrating the relationship between the focal point position of an objective lens and the superficial scattered light detection value and the fluorescence detection value obtained by a light detector, obtained by a variant of the present embodiment.

As a result, the computer can obtain the relationship between the received light detection value from the one light detector and the objective lens position information from the position sensor as shown in FIG. 4, for example.

As is clear from FIG. 4, a first peak $P_1$ thought to be by means of surface scattered light and a second peak $P_2$ thought to be by means of fluorescence can be distinguished and detected.

The computer can therefore, in the same way as the previously described structure, detect the first peak $P_1$ based on the received light detection value from the light detector, and obtain objective lens position information $X_1$ corresponding to the first peak $P_1$.

Then, when the focal point position of the objective lens is further moved toward the interior of the sample, the computer can detect the second peak $P_2$ and obtain objective lens position information $X_2$ corresponding to the second peak $P_2$.

Then, the computer can obtain the depth distance information based on the difference in the positions of the objective lens $(X_2-X_1)$ attained as described above. In FIG. 4 for example, if the position $X_1$ of the objective lens when the reference point is detected is 0 mm and the position $X_2$ of the objective lens when the light emission point is detected is 1 mm, the computer can obtain a depth from the surface of the sample to the resin layer of 1 mm.

If the wavelength interval between surface scattered light and fluorescence from the sample is wide in this way, the depth from the surface of the sample to the test sample can be accurately obtained in the same manner as the previously described structure using one light path, one filter, and one light detector after the first half mirror 70. Further, this kind of structure can be structurally simplified compared to the previously described structure. Also, this type of structure, be cause it can reduce the number of optical components, simplifies the positioning of the optical components.

<Spectroscope>

The structure described above was described with regard to an example of obtaining spot information in the depth direction of the sample. However, the present invention is not limited to this. As a concrete, example thereof, by moving the pinhole in a direction perpendicular to the optical axis, the positions of the measurement spots on the surface of the sample and within the sample can be scanned one-dimensionally or two-dimensionally. The depth direction information of the inside of the sample is thereby preferably obtained as surface information.

Here, in the above structure, a photo-multiplier is preferably used as the light detector. However, when obtaining surface information, using a CCD or the like is preferable.

Further, in the above structure, instead of the band pass filter, inserting a scan type or multi-channel type spectroscope or the like to obtain spectrum information is preferable.

According to the depth measuring apparatus of the present invention as set forth hereinabove, an objective lens is arranged in the parallel light beam portion of a confocal optical system. The depth measuring apparatus, while the focal point position of the objective lens is changed in the optical axis direction, simultaneously obtains position information of the surface of a sample by means of a surface scattered light information acquirer and position information of the interior of the sample by means of a fluorescence information acquirer. As a result, the depth measuring apparatus can non-destructively perform measurement in the depth direction of the interior of the sample.

Also in the present invention, by using lenses with no chromatic aberrations as the objective lens and image forming lenses, non-destructive measurement in the depth direction can be more accurately performed.

What is claimed is:

1. A depth measuring apparatus for, with regard to a sample that includes a test subject having fluorescence within the sample and that has transmittance along at least a depth that is a measurement range, obtaining depth distance information of the test subject within the sample, with a position of a surface of the sample as a reference, the apparatus comprising:
    a light emitter including a point light source, for converting light from the point light source to a parallel light beam having an excitation wavelength causing only the test subject within the sample to emit fluorescence;
    an objective lens, provided freely movable in a light axis direction of the objective lens, for condensing a parallel light beam from the light emitter onto a measurement spot of the sample, the objective lens converting light from the measurement spot of the sample into a parallel light beam;
    a mover for moving the objective lens in its light axis direction;
    an image forming lens for forming an image of light from the measurement spot of the sample obtained via the objective lens;
    a confocal aperture, placed at a position optically conjugate to the point light source and a focal point position of the objective lens via the objective lens and the image forming lens, which is an image formation position of the image forming lens, for substantially passing only light from the focal point position of the objective lens;
    a surface scattered light information acquirer for detecting an amount of light passing through the confocal aperture and having a wavelength equivalent to the excitation wavelength, while the focal point position of the objective lens is being moved by the mover;
    a fluorescence information acquirer for detecting an amount of light passing through the confocal aperture and having a wavelength equivalent to the fluorescence wavelength, while the focal point position of the objective lens is being moved by the mover; and
    a distance information acquirer for obtaining at least relative distance information in the light axis direction between a position of the objective lens where a light amount detection value of surface scattered light by the surface scattered light information acquirer is maximum and a position of the objective lens where a light amount detection value of fluorescence by the fluorescence information acquirer is maximum, wherein
    depth distance information of the test subject within the sample is acquired based on the relative distance information obtained by the distance information acquirer, with a position on a surface toward the objective lens of the sample as a reference.

2. The depth measuring apparatus according to claim 1, wherein the objective lens and image forming lens are lenses without chromatic aberrations.

3. The depth measuring apparatus according to claim 1, wherein the light emitter comprises:
    an excitation wavelength selector for passing only light having a wavelength equivalent to the excitation wavelength causing only the test subject within the sample to emit fluorescence among the light from the point light source; and
    a collimator lens for converting light from the point light source to a parallel light beam, wherein
    a portion between the collimator lens and the objective lens is a parallel light beam portion.

4. The depth measuring apparatus according to claim 3, wherein the portion between the objective lens and the image forming lens is a parallel light beam portion, and wherein a half mirror is provided in the parallel light beam portion between the collimator lens and the objective lens, a parallel light beam from the collimator lens being incident on the objective lens via the half mirror, and light from the measurement spot of the sample obtained by the objective lens being incident on the image forming lens via the half mirror.

* * * * *